United States Patent

[11] 3,568,943

[72] Inventor Edward Robak
 Garden Grove, Calif.
[21] Appl. No. 825,504
[22] Filed May 19, 1969
[45] Patented Mar. 9, 1971
[73] Assignee Technicolor Inc.
 Hollywood, Calif.

[54] MOTION PICTURE FILM CARTRIDGE
 12 Claims, 12 Drawing Figs.
[52] U.S. Cl. .................................................. 242/55.19,
 242/71.1, 242/76
[51] Int. Cl. .................................................. B65h 17/48,
 G11b 23/06
[50] Field of Search .......................................... 242/55.19
 (A), 55.19, 55.21, 55.17, 197, 198, 194, 193,
 71.1, 76; 352/72, 78, 126, 128, 156

[56] References Cited
 UNITED STATES PATENTS
 3,278,252 10/1966 Wagner et al. ................. 352/128
 3,289,964 12/1966 Vito ............................. 242/55.19A
 3,479,112 11/1969 Lester ........................... 352/78

Primary Examiner—George F. Mautz
Attorney—Lyon & Lyon

ABSTRACT: There is disclosed herein a cartridge for a continuous loop roll of motion picture film, such as Super 8 sound motion picture film. The cartridge includes top and bottom sections, and a turntable disposed between the sections for supporting a roll of film, such as 600 feet in length. One section of the cartridge includes a film guide channel for directing the inner convolution of film from the central portion of the roll to a film gate engaging portion of the cartridge for projection of the film which, after projection, is returned to the outer convolution of the roll. The film guide channel includes a plurality of molded projections which cause the film to be supported essentially solely by an edge thereof to prevent rubbing of either surface of the film thereby preventing abrading and scratching of the surfaces of the film.

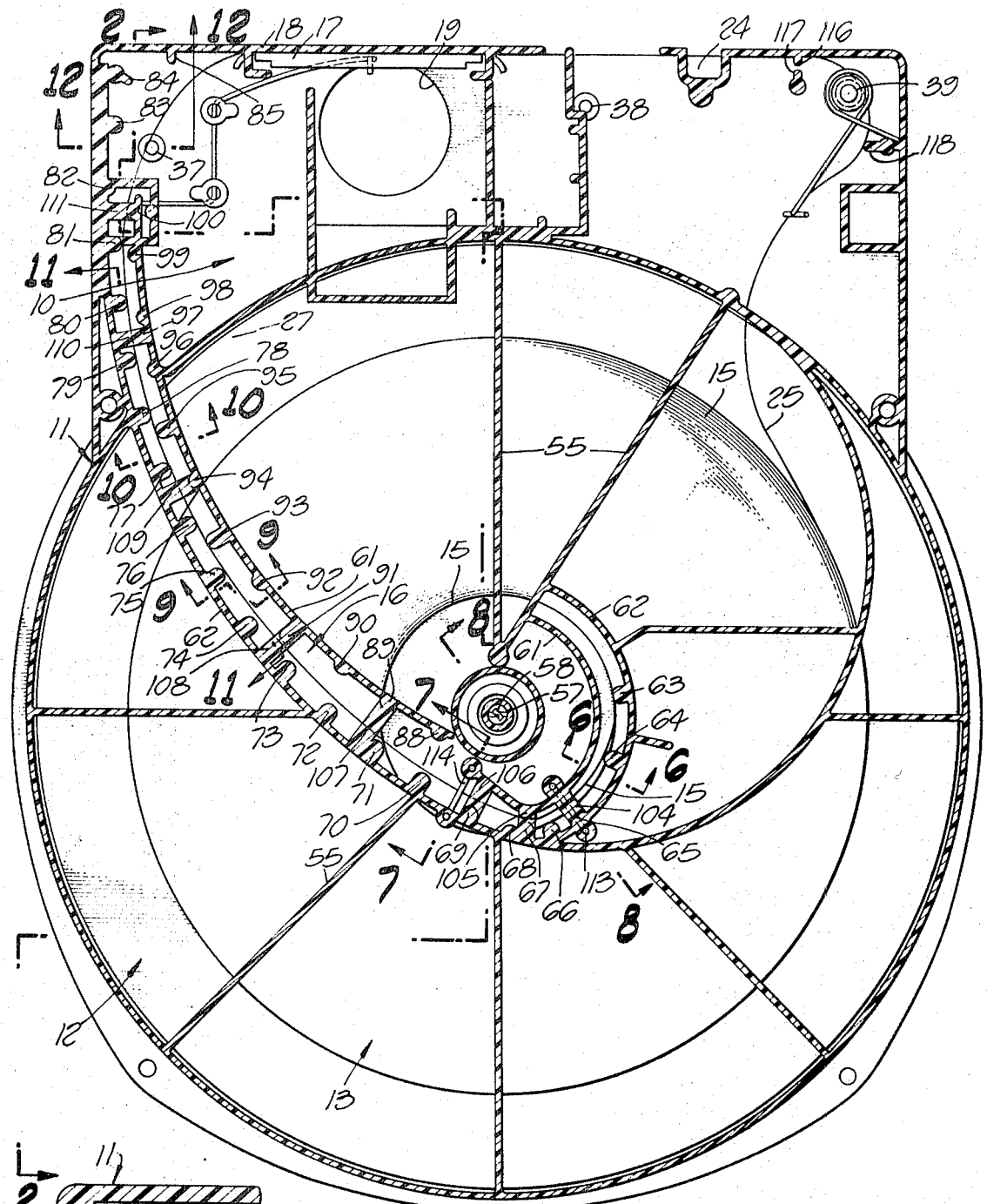

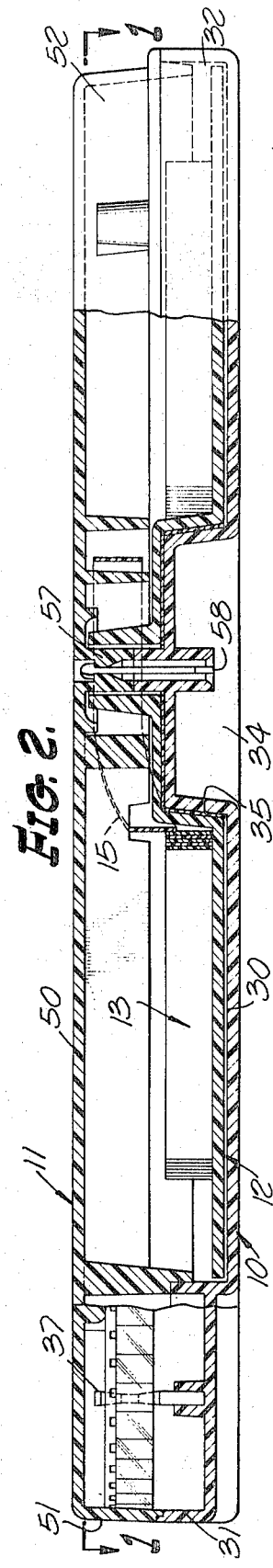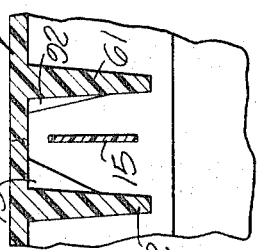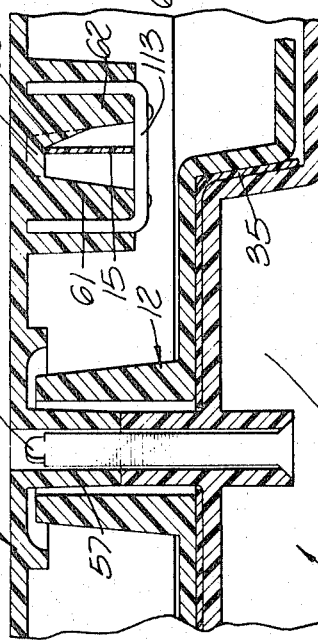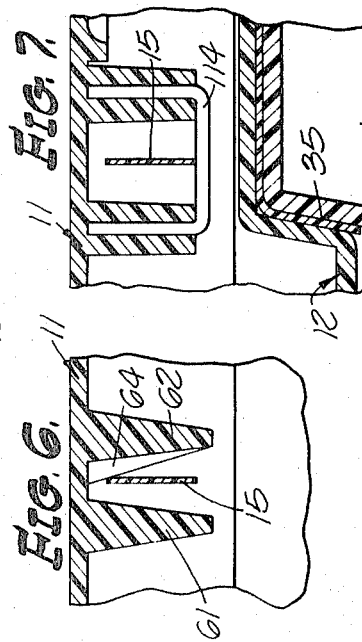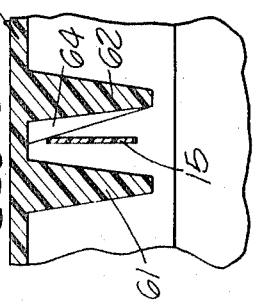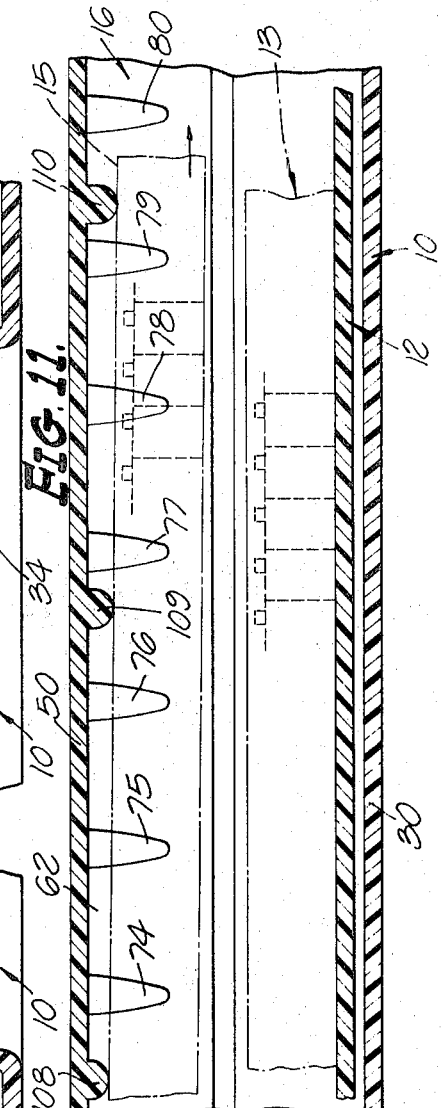

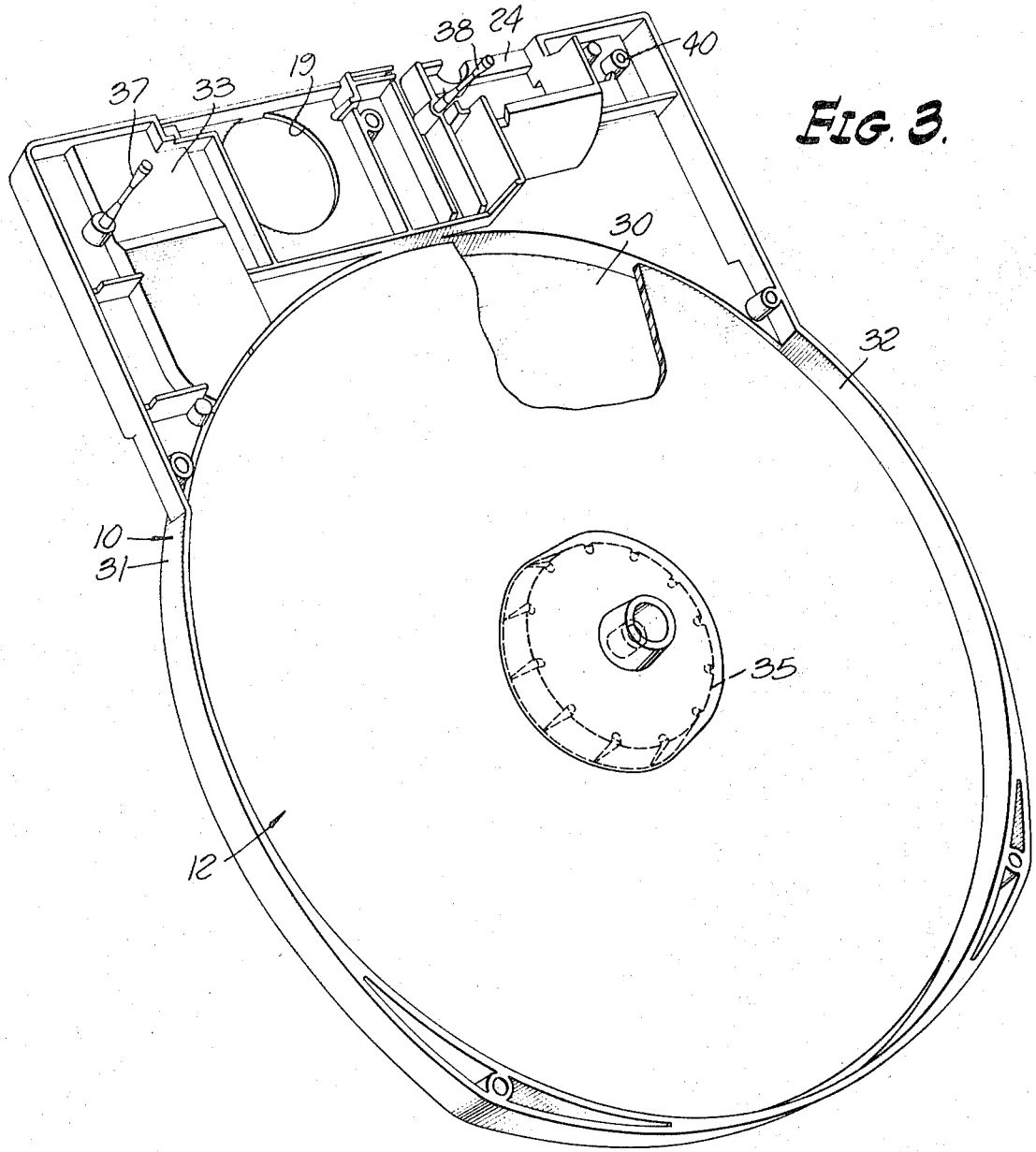

INVENTOR.
EDWARD ROBAK
BY
Lyon Lyon
ATTORNEYS

MOTION PICTURE FILM CARTRIDGE

This invention relates to motion picture film cartridges and more particularly to an improved guide structure for such cartridges which contain a continuous loop of film.

The usual type of motion picture projector, and in particular portable projectors for use with 8 or 16mm. film, requires a supply reel with the roll of film to be projected and a takeup reel on which the film is wound after it is projected. Except for self-threading projectors, the film also must be manually threaded through various sprockets and aperture or pressure plates before the picture projection can be started. In either type projector, after the complete roll of film has been projected, the end must be attached to the original reel and rewound thereon from the takeup reel.

Several cartridge lading projectors have been developed, such as illustrated in U.S. Pat. Nos. 3,139,789 and 3,397,937. Examples of currently available cartridge lading projectors are the Technicolor Model 610 and Model 1000. Although not limited thereto, the cartridge embodiment disclosed herein is adapted for use with the Model 1000.

A number of cartridges housing a continuous loop roll of film for use with cartridge loading projectors have been developed. Examples of such cartridges are found in U.S. Pat. Nos. 3,139,789, 3,206,757, and 3,244,471.

Generally, cartridges for a continuous loop roll of film, or other web material such as magnetic tape for that matter, include one or more guide surfaces or guide channels presenting surfaces, which tend to abrade the surface of the film. As will be apparent to those skilled in the art, any abrading or scratching of the surface of the film, or the like, is undesirable.

Accordingly, it is a principal object of this invention to provide an improved cartridge for a continuous loop of material, such as motion picture film, and which includes a novel guide channel therein.

It is an additional object of this invention to provide a novel guide channel for a cartridge containing a continuous loop roll of film.

A further object of this invention is to provide a new film cartridge which facilitates feeding of a loop of film while reducing the chances of abrading the surface of said film.

These and other objects and features of the present invention will become better understood through a consideration of the following description taken in conjunction with the drawings in which:

FIG. 1 is a top cross-sectional view of a cartridge according to the present invention, the top cover surface thereof being omitted as indicated by line 1—1 in FIG. 2.

FIG. 2 is a cross-sectional elevational view of the cartridge taken along a line 2—2 of FIG. 1;

FIG. 3 is a perspective view of the bottom section or half of the cartridge along with a film roll turntable mounted therein;

FIGS. 6 through 11 are cross-sectional views taken along various portions of FIG. 1, and illustrate in section the film guide channel according to the present invention; and FIG. 12 is a cross-sectional view of the cartridge taken along a line 12—12 of FIG. 1.

Figure 4:
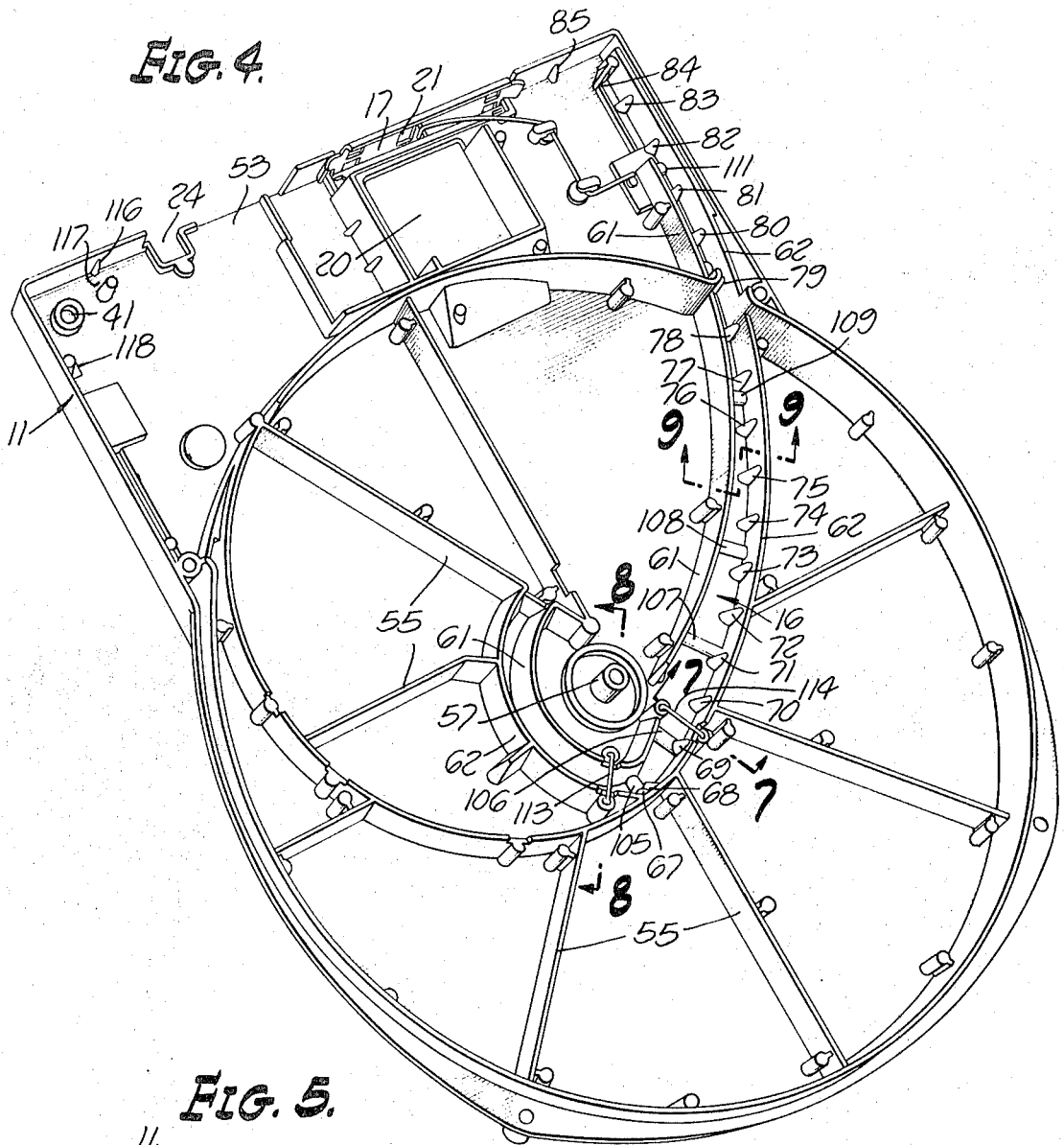
FIG. 4 is a perspective view of the inside of the top section or half of the film cartridge.

Briefly, in accordance with the concepts of the present invention, a cartridge for a continuous loop roll of film for use with a cartridge-loading motion picture projector is provided. The cartridge includes bottom and top sections, within which is disposed a continuous loop roll of film. The inner convolution of the roll is removed and fed to an outer or front portion of the cartridge for projection by a projector, and then returned as the outer convolution of the roll. One section of the cartridge includes a film guide channel for feeding the inner convolution of the film and supporting the film essentially solely by one edge of the film rather than either of the surfaces of the film to thereby prevent abrading and scratching of the surfaces of the film. Although reference is made to the film guide channel receiving the inner convolution of the film the use of a turntable for feeding the film are described herein, it is to be noted that the guide channel concepts are usable with either convolution of film and that it is not necessary to m employ a turntable in the cartridge.

Turning now to the drawings, and particularly FIGS. 1 through 4, t an embodiment of a film cartridge according to the concepts of the present invention is disclosed including a cartridge bottom half or section 10 (not FIGS. 1—3), a cartridge top half or section 11 (note FIGS. 1, 2 and 4), a film roll supporting turntable 12 (note FIGS. 1—3), and a continuous loop roll of film 13 (note FIGS. 1 and 2). Both cartridge sections 10 and 11 and the turntable 12 may be molded of plastic. The film is conventional motion picture film, such as Super 8 film having an optical soundtrack.

As can be seen from FIG. 1, the inner convolution of film 15 is directed through a film guide channel 16 formed in the underside of the top section of the a cartridge in the film roll receiving chamber of the cartridge, and the film is directed to an aperture plate 17 at the front portion of chamber 18 of the cartridge which receives the film loop for projection thereof. The front portion 18 is adapted to be inserted into a cartridge loading motion picture projector, such as the Model 1000 noted earlier. The film passes the aperture plate 17 and is projected by means of a light source (not shown) of the projector which directs light through an aperture 19 (note FIG. 1 and 3) in the bottom section 10 of the cartridge onto a reflecting surface (not shown) which is pivoted into an aperture 20 (note FIG. 4) in the top section 11 of the cartridge to reflect the light from the light source through an aperture 21 (note FIG. 4) in the aperture plate 17. The film continues to move past an area 24 of the front portion 18 of the cartridge where pickup of the optical soundtrack of the film is accomplished. The film then returns as an outer convolution at 25 (note FIG. 1) of the roll 13. The film is moved past the aperture plate 17 by a conventional claw mechanism (not shown) of the projector, and is aided in its movement by rotation of the turntable 12 upon which the of film 13 is disposed. Rotation of the turntable 12 is accomplished by means of a drive wheel (not shown) of the projector which engages the turntable at a point 27 (note FIGS. 1 and 3).

Turning now to a more detailed discussion of the construction of the film cartridge, the bottom section 10 has a lower portion or cover 30, and upwardly depending side portions 31 and 32 as best seen in FIGS. 2 and 3. The bottom section 10 likewise has a front portion 18 of the overall cartridge as noted earlier. The central portion 34 of the bottom section 10 is formed as best seen in FIG. 2 to provide a hub for the turntable 12. A bushing a of suitable material, such as silicone impregnated paper, 35 is provided between the turntable 12 and he bottom section 10. The roll of film 13 rests on the turntable 12 as seen in FIG. 2. Pin guides 37 and 38, having an hourglass configuration, are secured to the bottom section 10 as seen in FIGS. 1 and 3. Additionally, a roller 39, also having an hourglass configuration, is mounted on a pin between receptacles 40 and 41 in the respective bottom and top sections 10 and 11.

The top section 11 of the cartridge is generally similar to the bottom section and includes an upper portion or cover 50, sides 51 and 52, and a front portion 53 forming, together with the front portion 33 of the top section 10, the front portion 18 of the overall cartridge. The top section 11 also includes a plurality of radiating ribs or stiffeners 55, the lower edges of which serve to maintain the film properly in roll form. The top section also includes a central bushing portion 57 for the central portion of the turntable 12. A fastener clip 58 extends through the central portion of sections 10 and 11, and similar clips extend through peripheral portions thereof, to secure the sections together.

Figure 5:
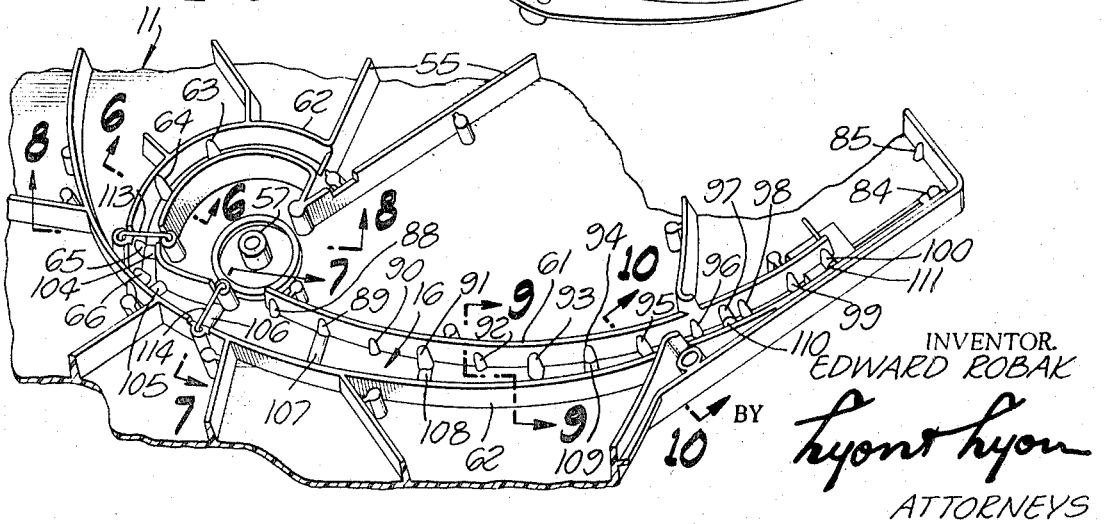
FIG. 5 is a fragmentary perspective view of the inside of the top section of the cartridge.

As noted earlier, the top section 11 of the cartridge includes an improved film guide channel 16. This film is a molded integral part of the top section 11. The film guide is in the form of a channel defined by sides or walls 61 and 62 as best seen in FIGS. 1 and 4. It should again be noted that FIG. 1 is a sectional view taken along the line 1–1 of FIG. 2, and that FIGS. 4 and 5 are views of the underside of the top section 11; that is, the top section 11, as seen in FIGS. 4 and 5, has been removed from the bottom section as seen in FIG. 3 and turned over. Each of the sides 61 and 62 has a plurality of integral inclined protrusions which serve to support the film by the edge thereof while preventing the surfaces of the film from rubbing against the sides 61 and 62. Protrusions 63—85 are adjacent the inner surface of side 62 protrusions 88—101 are adjacent the inner surface of side 61. It will be noted that these protrusions are inclined and form, in effect, see essentially sections of pyramids. Additionally, base protrusions 104—111, essentially in the form of sections of cylinders, are provided at the bottom of the channel 16 on the of the upper portion 50 of top section 11. Additionally, U-shaped clips 113 and 114 are provided for supporting the bottom edge of the inner convolution of the film 15 as it feeds into the guide channel 16.

Thus, the guide channel 16 has a beginning section at the inner convolution of the film 15 including outer inclined protrusions 63—69, base protrusions 104—106, and the clips 113 and 114. The intermediate section of the channel includes outer protrusions 70 through 78, inner protrusions 88—95, and base protrusions 107—109. The terminal portion of the channel includes outer protrusions 79—83 (as well as protrusions 83—85 which are outside the actual channel proper), inner protrusions 96—100, and base protrusions 110 and 111. These various protrusions are also seen in the cross-sectional views of FIGS. 6—11. Similar side protrusions 116—118 are provided near the roller 39 for facilitating return of the film 15 to he outer convolution of the roll with a minimum of film surface contact.

It will be apparent that the side and base protrusions serve to prevent the surfaces of the film from engaging the inside surfaces of the sides 61 and 62 of the guide channel, and that the film is essentially guided solely by an edge thereof. The film 15 moves up from the plane of the roll 13 roll 13 into the entry portion of the guide channel, and moves along the guide channel to the front 18 of the cartridge to the aperture plate 17, ultimately being returned at 25 as the outer convolution of film to the plane of the roll.

The channel 16 feeds the film 15 from the first chamber of the cartridge which holds the film roll, to the second chamber 18 at the front of the cartridge for projection of the film. The film is maintained in a vertical position in the channel and is fed in a smooth curved manner without buckling or twisting. The spiral channel 16 essentially maintains the film in the form of a curved beam structure, and keeps the film rigid and vertical without buckling.

The present embodiment of this invention is to be s considered in all respects as illustrative and not restrictive.

I claim:

1. A film cartridge for use in a motion picture projector, comprising:
    a housing for receiving a continuous loop roll of film in the form of a roll and a loop of film extending therefrom, said housing having a first chamber for receiving said roll and a second chamber for receiving said loop for allowing projection of said film; and
    said housing having a first portion for supporting said roll, and having film guide channel means for directing said loop of film to said second chamber for projection of the film said channel means comprising walls depending from a surface of said housing, said walls having a plurality of inclined protuberances for supporting said film loop as it is fed to said second chamber substantially solely by an edge of the film.
2. A cartridge as in claim 1 wherein:
    said housing comprises first and second sections defining said chambers, the first section serving to support said film roll, and said second section having formed therein said channel means.
3. A cartridge as in claim 2 wherein said second section comprises:
    a cover having a first side forming an outer cover for said cartridge and having a second side with said channel means formed in said second side, said channel means being generally in the form of a spiral beginning near the central portion of the second side of said cover and extending into said second chamber of said housing for feeding an inner convolution of film from said roll to said second chamber.
4. A cartridge as in claim 2 wherein:
    said second section comprises the top of said cartridge and said channel means is formed in the underside thereof extending substantially spirally from a central portion of said first chamber to said second chamber for fed feeding an inner convolution if of film from said roll to said second chamber.
5. A cartridge as in claim 4 including:
    support clip means coupled with said channel mean for aiding in supporting an edge of said film extending from an inner convolution of said roll as the same progresses through said channel means.
6. A film cartridge for use in a motion picture projector having a cartridge receiving portion, comprising:
    A housing for receiving a roll of film for projection of the film by a motion picture projector, said housing having a first chamber for receiving said roll of film and a second chamber for receiving a portion of said film extending from said roll for allowing projection of said film; and
    said housing comprising first and second sections defining said chambers, the first section serving to support said roll of film, and said second section having formed therein guide channel means for directing a portion of said film to said second chamber for projection of the film, said channel means comprising a plurality of inclined protuberances extending from a surface of said second section for supporting said portion of said film as it is fed to said second chamber substantially solely by an edge of the film.
7. A cartridge as in claim 6 wherein:
    said channel means includes walls depending from a surface of said second section and said inclined protuberances are formed along the inside of said walls, and said channel means includes base protuberances between said walls at said surface of said second section.
8. A cartridge as in claim 7 wherein:
    said channel means extends in a spiral fashion from the central portion of said second section for directing an inner convolution of film from said roll to said second chamber.
9. A cartridge as in claim 8 including:
    a turntable disposed between said first and second sections of said housing, said turntable serving to support said roll of film between said turntable and said second section.
10. A film cartridge for use in a motion picture projector comprising:
    a housing for receiving a continuous loop roll of film in the form of a roll and a loop of film extending therefrom, said housing having first and second sections defining a first chamber for receiving said roll and a second chamber for receiving said loop for allowing projection of said film;
    a turntable disposed within said housing between said first and second sections for supporting said roll between said turntable and said second section; and
    said second section having a first side forming an outer cover for said cartridge and having a second side including guide channel means on said second side, said channel means being generally in the form of a spiral beginning near the central portion of said second side and extending into said second chamber of said housing for feeding an inner convolution of film from said roll to said second chamber, said channel means comprising walls depending from said second side of said second section, each of said walls having a plurality of inclined protuberances for supporting supporting said film loop as it is fed to said second chamber substantially solely by an edge of the film.

11. A cartridge for a web of material in the form of a continuous loop roll comprising:
- a housing having first and second sections defining a first chamber for receiving said roll and a second chamber for receiving a loop extending from said roll;
- said first section of said housing serving to support said roll; and
- said second section of said housing having formed thereon guide channel means for directing said loop of said web to said second chamber, said channel means comprising wall members depending from a surface of said second section, said wall members each having a plurality of inclined protuberances for supporting said loop as it is fed to said second chamber substantially solely by an edge of the web of material.

12. A cartridge as in claim 11 wherein:
- said guide channel means is a spiral channel extending from said first chamber to said second chamber and maintains said web of material in a smooth curved vertical fashion without buckling thereof.